Oct. 17, 1939.    R. L. CAMPBELL    2,176,852
HEATING METHOD AND APPARATUS
Filed Jan. 8, 1936
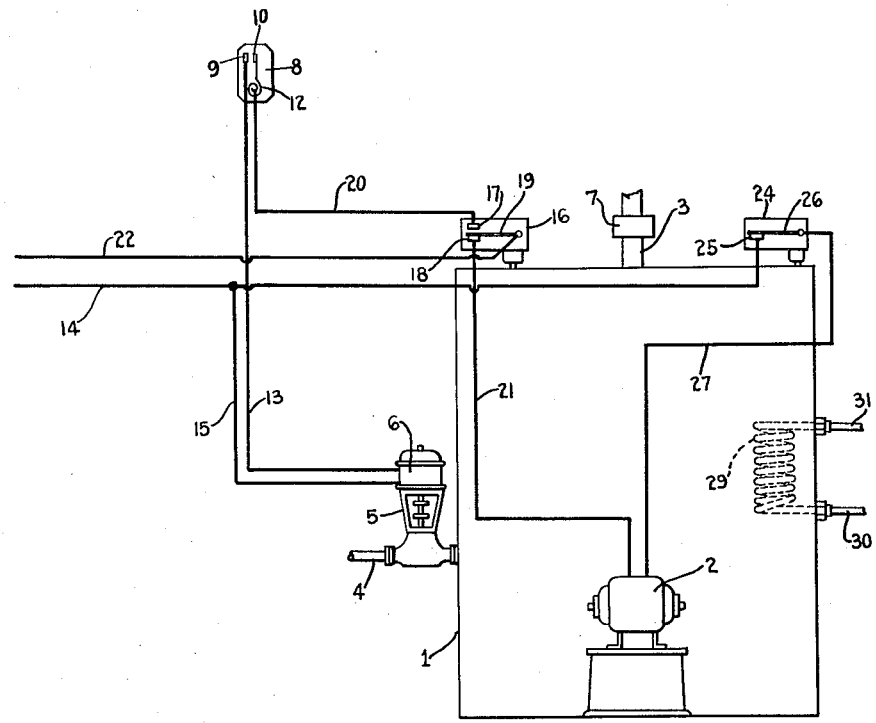
INVENTOR
Richard L. Campbell
BY
Andrew K. Foulds
his ATTORNEY Patented Oct. 17, 1939

2,176,852

UNITED STATES PATENT OFFICE 2,176,852

HEATING METHOD AND APPARATUS

Richard L. Campbell, Birmingham, Mich., assignor to Detroit Lubricator Company, Detroit, Mich., a corporation of Michigan Application January 8, 1936, Serial No. 58,142

14 Claims. (Cl. 236—9)

My invention relates generally to a method of heating and to heating systems, and more particularly to a system and method of control for hot water heating systems which are adapted among other uses for the heating of buildings.

One of the objects of my invention is to provide a new and improved control system and method for controlling the heating of water and also controlling the supplying of the heated water to heat exchange or transfer means such as the radiators of a heating system.

Another object of my invention is to provide a new and improved control system and method particularly applicable to dwellings for controlling the heating and supplying of water to the radiators of a heating system and for also controlling the heating of water for domestic use, and to provide a control system of this character which will operate to maintain the domestic water supply at the desired temperature and also operate to maintain the temperature of a room or other enclosed space to be heated at the desired temperature in a system wherein both the water for domestic use and the water for supply to the radiators are heated by the same heating means.

More specifically, one object of my invention is to provide a control device for a heating system of the above mentioned character by means of which the temperature of the domestic water supply will be maintained at the desired temperature without heat being supplied to the radiators of a room or other enclosed space unless the temperature of the room decreases below the desired room temperature.

Another object of my invention is to provide a heating system having a new and improved control system for controlling operation thereof in such a manner that so-called overtravel of the heating system or of the temperature of the medium to be heated will be materially reduced, with the result when applied to the heating of buildings or the like, that a more even or constant temperature will be maintained in the room or other enclosed space to be heated.

The drawing shows a diagrammatic view of a heating system embodying my invention and by which my method can be carried into effect.

Referring to the drawing by characters of reference the numeral 1 designates in general a fluid heat source such as the boiler or heating apparatus of a hot water heating system having a suitable heat supplying means including a fuel stoker operated by an electric motor 2. Leading out of the boiler 1 and preferably from the top thereof is an outlet or feed pipe 3 through which heating fluid such as water from the boiler is supplied to the heat exchange or transfer means or radiators (not shown) in a room or other enclosed space to be heated. Connected into and through the side wall of the boiler is a return pipe 4 through which the heating fluid or water returns to the boiler from the radiators. In the return line 4 there is a pump means or water circulator 5 which is preferably located adjacent the boiler, as shown. The water circulator 5 may be of any suitable type and is operated by an electric motor which, in the present instance, is enclosed in a casing 6 and mounted on the upper end of the circulator 5. A suitable check valve 7 is preferably provided and located in the feed line or riser pipe 3 to prevent back flow and circulation of the water by gravity.

In the room or other enclosed space, the air of which is to be heated, there is a thermostat 8 which may be of any suitable type, the thermostat diagrammatically shown in the drawing having a fixed contact 9 engageable by a movable contact 10 which is carried by an arm 12 of bimetal or other material movable in response to changes in ambient temperature of the air or any other medium to be heated. Connecting the fixed contact 9 of the room thermostat and the motor of the water circulator 5 there is a lead wire 13, the other terminal of the electric motor being connected to a main lead wire 14 by a connecting lead wire 15.

A control device 16 of the snap-acting type is provided for controlling the operation of the motor 2 of the heat supply means, and for also controlling the operation of the water circulator 5. The control device 16 is preferably mounted on the top of the boiler 1 and is preferably of the type which is operable in response to boiler temperature. The control device 16 includes a pair of spaced and fixed contacts 17 and 18, with either of which a switch blade 19 is operable to make contact, the blade 19 moving with a quick or snap-action from one to the other of the contacts 17 and 18, depending upon the temperature of the water in boiler 1. The fixed contact 17 of the control device 16 is connected to the room thermostat arm 12 by a lead wire 20, and the other fixed contact, or contact 18 is connected by a lead wire 21 to one terminal of the electric motor 2. The movable arm or blade 19 of the control device 16 is connected to the other of the main lead wires, designated by the numeral 22.

Preferably a safety control device 24 is provided to operate at a predetermined high boiler temperature to cut out the motor 2 of the heating means in the event that the control device 16 should fail to open the circuit to the motor 2 at a lower boiler water temperature. The safety control device 24 may be mounted on the top of the boiler 1 and includes a fixed contact 25 which is engaged by an arm or blade 26 which is normally in closed circuit position, as shown, but movable in response to a predetermined high boiler water temperature to open the circuit to the motor 2. The motor 2 and the arm 26 are connected by a lead wire 27, while the fixed contact 25 of the safety control device is connected to the main lead line 14.

Disposed in the boiler 1 there is a coil of tubing, or pipe 29, for the circulation of water for domestic use, the water circulating through the coil 29 being heated by the surrounding boiler water. Water enters the coil 29 from a suitable source of supply through inlet pipe 30 and is heated and may flow to a storage tank (not shown) through an outlet pipe 31. The coil may be mounted in the boiler in any well known suitable manner.

The operation of the herein described heating apparatus and the method effected thereby is as follows: The control device 16 may be set to operate at a predetermined desired boiler temperature, say 170° F., to close the circuit to the fuel stoker motor 2 and may be set to operate and open the circuit to the motor 2 and close circuit to the water circulator 5, at say 175° F. When the switch arm 19 of the control device 16 is in engagement with fixed contact 18 it will be seen that the circuit to the motor 2 will be closed from the main lead wire 22 through switch arm 19, lead wire 21, motor 2, lead wire 27, switch arm 26 and the main lead wire 14. When the circuit is closed to the motor 2, heat is supplied to the water in the boiler 1 and when the temperature of the water increases to the desired temperature, or 175° F., the switch arm 19 will open circuit to the motor and engage its other fixed contact 17. It will be seen that the water of the domestic supply, circulating through the coil 29, will also be heated to the desired temperature, or 175° F. When the switch arm 19 is in engagement with contact 17 it will be seen that the circuit will be completed to the motor of the water circulator 5 if the room thermostat 8 is unsatisfied, or in closed circuit position, this circuit being from lead wire 22 through switch arm 19, lead wire 20, lead wire 13 to the water circulator motor, and through lead wire 15 to the main lead wire 14. It will thus be seen that both the room thermostat 8 and the control device 16 cooperate to control the water circulator 5 so that water is not supplied to the radiators unless both of these devices have closed their respective gaps in the circuit of motor 6. The control device 16 controls the operation of the stoker to maintain the boiler water at the desired temperature so that when the room thermostat calls for heat, hot water at the desired temperature will be available for supply to the radiators. When the circuit is completed to the motor of the water circulator 5, hot water from the boiler 1 will be supplied to the radiators of a room or other enclosed space to be heated, it being understood that the water circulating system including the boiler 1 is completely filled with water. As water is supplied from the boiler 1 to the radiators, and the relatively cooler water returns to the boiler, the temperature of the boiler water will decrease and when the temperature of the water decreases below 170° F., the control device 16 will act to cut out the water circulator 5 and close circuit to the motor 2 to supply additional heat to the water in the boiler. The control device 16 will control the operation of the circulator 5 to provide an intermittent or staged supply of heated water to the radiators, the duration of the supplying interval being dependent upon the differential setting of the device 16 and the rate of heat loss or transfer from the heated water. With a differential switch setting of say 5° F. as above, for example, the radiator supplying interval will be of relatively short duration. During the period or interval when the circulator 5 is "off" or at rest, the heat supplied and being supplied to the room air will cause room air circulation and if the air circulating by convection and by gravity upon blending with the remaining air results in a mixture having the desired predetermined temperature, then the room thermostat or control 8 will become satisfied and open the circulator circuit at contacts 9, 10. When the water supply in the boiler or heating apparatus 1 has again been raised by the heat source or stoker to close contacts 17, 19, another increment of heat will be supplied to the radiators and thence to room air. From the foregoing it will be apparent that my system will substantially overcome any overriding or over-travel of room temperature, as obviously the circulator will stop further supply to the radiators upon circuit break at contacts 9, 10 and the check valve 7 will prevent gravity circulation of the heating fluid or water. The excess heat to the room air can in no instance exceed the residual heat of the radiators which have in effect been "turned off" so that the temperature of the room air will practically have no increase. It may be noted that the contacts which I have described as "fixed" have been merely so described to distinguish from the automatically movable blade contacts and may be adjustable to provide for temperature regulation, so also, each of the controls 8, 16 and 24 is preferably of a type which permits a regulatable setting for determining its point or temperature of response or operation. It is also to be noted that during the operation of the circulator a complete elimination of further heat supply to the boiler water is not imperative, but merely that it is materially reduced. So also, and particularly in winter operation, there may be some feeding of heating fluid to the radiators during the supply of heat to the fluid or water when the room thermostat 8 is "calling for heat," i. e., when contacts 9, 10 are closed, though complete cut-off is preferable.

Although I have shown and described my control system in connection with a heating system having a fuel stoker, it will be understood that an oil burner, gas burner, or any other suitable heating means may be employed.

What I claim and desire to secure by Letters Patent of the United States is:

1. In a heating system, means operable for heating water for supply to a radiator of a room, means operable to supply the heated water to said radiator, control means responsive to the temperature of the water and operable upon a predetermined high temperature to render ineffective said heating means and to render effective said water supply means, and temperature responsive means operable in response to the temperature of a room to be heated for controlling the operation of said water supply means solely while said heating means is ineffective.

2. In a hot water heating system having a circulatory system including a boiler and a radiator in a room to be heated, electrically operated means for circulating water through said system, a room thermostat in circuit with said electrically operated means, electrically operated means for supplying heat to the water in said boiler, and a control device operable in response to a predetermined boiler temperature for starting said electrically operated heat supply means and for stopping said electrically operated water circulating means independently of said thermostat, said control device being operable in response to a predetermined boiler temperature above said first-named boiler temperature for stopping said electrically operated heat supply means and for also starting said electrically operated water circulating means when said room thermostat is in closed circuit position.

3. The method of controlling the heat input to a medium which comprises providing a fluid heat source having a predetermined temperature range, supplying heat to the fluid source upon temperature decrease of the fluid heat source to the lower limit of the range, reducing the supply of heat to the source upon its temperature increase to the higher limit of the range, and then supplying the heated fluid to the medium to be heated simultaneously with the reduction in supply of heat to the fluid when the temperature of the medium is below a predetermined temperature.

4. The method of controling the heat input to a medium which comprises providing a fluid heat source having a predetermined temperature range, supplying heat to the fluid upon temperature decrease of the heat source to the lower limit of the range, reducing the supply of heat to the source upon its temperature increase to the higher limit of the range, supplying the heated fluid to the medium to be heated simultaneously with the reduction in supply of heat to the fluid when the temperature of the medium is below a predetermined temperature, reducing the supplying of heated fluid upon decrease of the heat source temperature to the lower limit of the range, and simultaneously with reducing the supplying of the heated fluid supplying heat to the fluid source.

5. The method of controlling the heat input to a medium which comprises providing a fluid heat source having a predetermined temperature range, supplying heat to the fluid upon temperature decrease of the heat source to the lower limit of the range, reducing the supply of heat to the source upon its temperature increase to the higher limit of the range, simultaneously starting supplying the heated fluid to the medium to be heated upon starting the reduction in supply of heat to the fluid when the temperature of the medium is below a desired temperature, and controlling the supply of heated fluid to the medium in accordance with the temperature of the medium.

6. The method of controlling the heat input to a medium which comprises providing a fluid heat source having a temperature range, supplying heat to the fluid upon temperature decrease of the heat source to the lower limit of the range, reducing the supply of heat to the source upon its temperature increase to the higher limit of the range, simultaneously with the reduction supplying the heated fluid to the medium when the temperature of the medium is below a predetermined temperature to heat the same, reducing the supply of heated fluid to the medium simultaneously with the decrease of the heat source temperature to the lower limit of its range, and controlling the supply of heated fluid to the medium in accordance with the temperature of the medium.

7. In a heating system having means for heating a heat transfer fluid and having means for controlling the supply of the fluid to a heat transfer element for heating an enclosed space, a control system for the heating system comprising a thermostat responsive to the temperature of the enclosed space to be heated and operable to control the supply control means, and means responsive to a predetermined temperature of the heat transfer fluid for controlling the heating means to decrease the heat input to the heat transfer fluid and simultaneously operable to control the operation of the supply control means when said thermostat is dissatisfied.

8. In a heating system, heating means operable to heat fluid, means operable to control delivery of the heated fluid to a medium to be heated, a thermostat responsive to the temperature of the medium to be heated, and control means responsive to the temperature of the heated fluid and operable to control said heating means independently of said thermostat and cooperable with said thermostat to control said delivery control means, said second-named control means at a predetermined temperature of said heated fluid being operable to decrease the heat input to the fluid by the heating means and also being operable at said predetermined fluid temperature to increase the supply of the heated fluid to said medium by the delivery control means when said thermostat is dissatisfied.

9. In a heating system, heating means for heating a fluid, means to deliver the heated fluid to a medium to be heated, a thermostat responsive to the temperature of the medium to be heated and operable to control said delivery means, and a control device responsive to the temperature of the heated fluid and operable at temperature limits, said control device at the lower temperature limit acting independently of said thermostat to increase the heat input to the fluid by said heating means and at the higher temperature limit decreasing the heat input by the heating means and cooperating with said thermostat to increase the supply of the heated fluid to the said medium when said thermostat is dissatisfied.

10. In a heating system, heating means operable to heat a fluid and to heat water for domestic use, control means responsive to the temperature of the heated fluid and operable at predetermined temperature limits to control said heating means, said heating means under the control of said control means being operable to maintain the temperature of the heated fluid within a temperature range suitable for heating the domestic water and suitable at the higher limit for heating a medium to be heated, means operable to control delivery of the heated fluid to the medium to be heated and controlled by said first-named control means, and a thermostat responsive to the temperature of the medium to be heated and operable to control said delivery control means, said first-named control means being operable at the lower temperature limit to increase the heat input to the fluid by the heating means and at the higher temperature limit to decrease the heat input to the fluid and to cooperate with said thermostat to increase the supply of the fluid by the delivery control means to the medium to be heated if said thermostat is dissatisfied.

11. In a fluid heating circulatory system including a boiler and a radiator in a room to be heated, a heat transfer fluid in said boiler, electrically operated means for circulating said fluid through said system, a room thermostat in circuit with said electrically operated means, electrically operated means for supplying heat to the fluid, and a control device operable in response to a predetermined high temperature of the fluid in said boiler to energize said thermostat circuit and operable at a predetermined low temperature of said fluid to deenergize said thermostat circuit and to energize said supplying means independently of said thermostat.

12. In a heat transfer system, a medium to be tempered, a heat transfer medium for tempering said medium to be tempered, means for tempering said transfer medium, means for controlling the circulating of said transfer medium, switch means sensitive to the temperature of said medium to be tempered and operative to control said circulating controlling means, switch means sensitive to the temperature of said transfer medium and operative upon a predetermined temperature thereof to render said tempering means effective and to render said first-named switch means ineffective, and operable upon a second predetermined temperature of said transfer medium to render said tempering means ineffective and to render said first-named switch means effective.

13. In a heating system, a medium to be heated, a heat transfer medium for heating said medium to be heated, means for supplying heat to said transfer medium, switch means sensitive to the temperature of said medium to be heated and operative to control the heat supplied thereto, switch means sensitive to the temperature of said transfer medium and operative upon a predetermined low temperature thereof to render said supplying means effective and to render said first-named switch means ineffective, and operable upon a predetermined high temperature of said transfer medium to render said supplying means ineffective and to render said first-named switch means effective.

14. In a hot water heating system, a hot water boiler, electrically operated means for heating the water in said boiler, electrical means for circulating the water from said boiler through a radiating system, thermostatic switch means sensitive to the output of said radiating system and electrically connected to said circulating means, thermostatic switch means sensitive to the temperature of the water in said boiler and being in circuit with said first-named switch means and operable upon a predetermined high temperature of said boiler water to supply electrical energy to render said first-named switch means effective to control the operation of said circulating means and to disconnect the supply of electrical energy to said heating means, said second-named switch means being operable upon a predetermined low temperature of said boiler water to disconnect said electrical energy supply to said first-named switch means and to supply electrical energy to energize said heating means.

RICHARD L. CAMPBELL.